United States Patent [19]

Ferrero et al.

[11] 4,145,229

[45] Mar. 20, 1979

[54] PROCESS FOR THE PREPARATION OF THERMOSTABLE BLACK AND BROWN PIGMENTS AND THE PIGMENTS SO PRODUCED

[75] Inventors: Francesco Ferrero; Giuseppe Sironi; Bruno Viviani, all of Novara, Italy

[73] Assignee: Montedison S.p.A., Milan, Italy

[21] Appl. No.: 813,452

[22] Filed: Jul. 7, 1977

Related U.S. Application Data

[63] Continuation of Ser. No. 685,071, May 10, 1976, abandoned.

[30] Foreign Application Priority Data

May 13, 1975 [IT] Italy .............................. 23258 A/75

[51] Int. Cl.$^2$ ............................................ C04B 31/02
[52] U.S. Cl. .................... 106/304; 106/309; 423/599
[58] Field of Search .................... 106/288 B, 304, 309; 423/599

[56] References Cited

U.S. PATENT DOCUMENTS 3,615,810  10/1971  Holznagel ........................... 106/304

*Primary Examiner*—L. Dewayne Rutledge
*Assistant Examiner*—John P. Sheehan

*Attorney, Agent, or Firm*—Stevens, Davis, Miller & Mosher

[57] ABSTRACT

A process is disclosed for the preparation of black and brown thermostable pigments consisting essentially of mixed phases of iron and manganese oxides, characterized in that:

(a). pyrolusite, in the form of particles having a mean diameter not exceeding 20 microns, is mixed and maintained in contact together with heptahydrated ferrous sulphate at a temperature between room temperature and 95° C.; and (b). the mass thereby obtained is dried, crushed and screened, and then calcined in the presence of air in a fluidized bed reactor at a temperature between 800° and 900° C.

The starting pyrolusite/heptahydrated ferrous sulphate mixture may be additioned with one or more compounds selected from the group consisting of $FeCl_2$, $SiO_2$, $FeCl_3$, $Na_2SiO_3$, $Fe_3O_4$, $NaAlO_2$, $KAl(SO_4)_2$ and $NaBO_2$. The total quantity of additives is between 0.5% and 5% by weight based on the final product. The starting pyrolusite/heptahydrated ferrous sulphate mixture may also be additioned with water in a quantity not exceeding 20% by weight. The residence time of the solids in the fluidized bed reactor is between 1 and 6 hours. The black and brown thermostable pigments obtained from the process are also claimed.

4 Claims, No Drawings

PROCESS FOR THE PREPARATION OF THERMOSTABLE BLACK AND BROWN PIGMENTS AND THE PIGMENTS SO PRODUCED

This is a continuation of application Ser. No. 685,071, filed May 10, 1976, now abandoned.

The present invention relates to a process for the preparation of thermostable pigments, and more particularly, to a process for the preparation of black and brown thermostable pigments consisting of mixed iron and manganese oxide phases and characterized by a very pure mass-tone and by an appreciable tinting strength.

The common magnetite-based inorganic black and brown pigments are not suited for incorporation as dyeing substances in materials which must be subjected to thermal treatments (such as concrete and ceramic manufactured articles for the building industry), because at temperatures exceeding 180° C. their color is altered by oxidation reaction from black magnetite to red hematite.

It is known that the black and brown pigments consisting of mixed $Fe_2O_3$ and $Mn_2O_3$ phases in solid solution are thermally stable at high temperatures, and that they may be prepared by subjecting to calcination a mixture consisting of iron and manganese oxides (or of iron and manganese compounds that are transformed to oxides upon calcination).

In order to obtain pigments of a good quality, it is necessary that the reaction between the iron and the manganese compounds take place to the fullest possible extent and that said reaction shall take place not only on the surface of the granules but in their interior as well. In fact, if the reaction were to take place prevailingly on the surface rather than within the granules, then, when the product is finally subjected to grinding, the pigment would turn out to be more or less spoiled by red reflections.

In order to increase the reactivity it is not sufficient to thoroughly mix together the reactants; in fact, it has been observed that the use of iron and manganese oxides of micronic size (1–5μ or more), even if intimately mixed together either in the dry state or in an aqueous medium, does not yield satisfactory results because, inasmuch as if calcination is carried out at low temperatures (below 830° C.), there is in fact obtained a pigment with a high tinting strength but with a dirty mass-tone; if one operates at medium temperatures (830°–880° C.) the tinting strength and the mass-tone are both modest; if one operates at high temperatures (greater than 880° C.) one obtains a high purity of tone but a low tinting strength.

According to a process in the prior art, thermostable black pigments consisting of 25–90% of $Mn_2O_3$ and 10–75% of $Fe_2O_3$ are prepared by the following procedures:

a the manganese and the iron compounds, in a finely comminuted form (the first with a particle size below 5μ and the second with a particle size below 1μ), and possibly with an alkaline salt acting as a mineralizing agent, are thoroughly mixed together; and b the mixture thus obtained is calcined at 800°–920° C. in an atmosphere having an oxygen content of between 7% and 20% by volume (that is, preferably in a relatively oxygen-poor air).

It is thus clear that, according to the prior art, particularly critical and burdensome conditions are required in the grinding of the starting manganese and iron compounds, for the preparation of the mixture of reactants, and in the calcining.

Therefore, one object of the present invention is that of providing a process that will allow the preparation of black and brown thermostable pigments whose tinting properties, especially the mass-tone and the tinting strength, shall be at a high level and in proper proportions.

Still another object of this invention is that of providing a process that will allow one to prepare thermostable black and brown pigments of excellent quality without burdensome conditions in the grinding of the reactants, in their mixing together, and in their calcining.

It has now been found (in accordance with the present invention) that a high degree of reactivity between the solid particles even inside the granules, as well as a strict control of the morphology of the pigment particles, may be obtained if as starting compounds pyrolusite and heptahydrated ferrous sulphate are used by adopting a special mixing technique for the mixing of said starting compounds, and if the subsequent calcining is carried out in a fluid bed.

As a matter of fact, it has surprisingly been discovered that by mixing together ferrous sulphate heptahydrate crystals with pyrolusite in the form of particles having a mean particle diameter not exceeding 20μ, and without addition of water inasmuch as the water of crystallization of the ferrous sulphate is sufficient, there is obtained a homogeneous slurry in which the solid $MnO_2$ particles react, slowly in the cold and more rapidly under heat, with the ferrous sulphate thereby becoming solubilized.

Another object of this invention is therefore a process for the preparation of thermostable black and brown pigments consisting or consisting essentially of mixed iron and manganese phases, characterized in that:

a pyrolusite in the form of particles having a mean particle diameter not exceeding 20 microns is mixed and maintained in contact together with heptahydrated ferrous sulphate at a temperature between room temperature and 95° C.; and b the mass thereby obtained, after drying, comminuting and sieving, is calcined in the presence of air in a fluid bed reactor operating at a temperature between 800° and 900° C.

Moreover, it has been found possible to influence in a selective way the mass-tone and/or the tinting strength of the pigment by admixing one or more additives selected from the group consisting of $FeCl_2$, $SiO_2$, $FeCl_3$, $Na_2SiO_3$, $Fe_3O_4$, $NaAlO_2$, $AlK(SO_4)_2$ and $NaBO_2$.

In fact, two classes of chemical additives have been discovered that develop differential and opposing actions on the dyeing properties of the product. These are:

a additives that bring about an increase of the tinting strength to the detriment of the purity of mass-tone; and b additives that improve the purity of mass-tone to the detriment of the intensity of the tinting strength.

Class (a) additives comprise: $FeCl_2$, $SiO_2$, $FeCl_3$, $Na_2SiO_3$ and $Fe_3O_4$. With regard to the relative intensity with which these additives act, the following sequence was established:

$$FeCl_2 > SiO_2 > FeCl_3 > Na_2SiO_3 > Fe_3O_4$$

that is, the intensity of their action decreases in going from $FeCl_2$ to $Fe_3O_4$.

Class (b) additives comprise: $NaAlO_2$, $KAl(SO_4)_2$ and $NaBO_2$, whose activities decrease in the following given order:

$$NaAlO_2 > KAl(SO_4)_2 > NaBO_2$$

According to this invention, black thermostable pigments may be prepared containing 17–65% by weight of $Mn_2O_3$ (preferably 20–33%) and brown thermostable pigments containing less than 17% by weight of $Mn_2O_3$ (in general, 2–15% but preferably 3–5%).

In the case of the black pigments, the heptahydrated ferrous sulphate and the pyrolusite are mixed together in such portions that the weight ratio Fe/Mn is between 5 and 0.5 (preferably between 4 and 2). In the case of the brown pigments, the Fe/Mn weight ratio is adjusted to a value greater than 5 (in general between 45 and 6, but preferably between 30 and 20).

In the practical application of the process according to this invention, one may start from a raw crystalized ferrous sulphate from any convenient source; for instance, one may start from $FeSO_4.7H_2O$ which is a byproduct of the preparation of $TiO_2$ via the sulphate process.

The heptahydrated ferrous sulphate is mixed together with technical pyrolusite (75–90% by weight of $MnO_2$) ground to below $100\mu$ and in the form of particles having a mean diameter not exceeding $20\mu$ (in general between 5 and $20\mu$).

The mixing may be carried out in any convenient equipment of known type, for instance in a ball mill, at a temperature between room temperature and 95° C.

In the case of brown pigments the reactants may be mixed and maintained in contact for a total time of few minutes. In the case of black pigments, the total time of mixing and maintaining in contact must be of 2 to 6 hours, preferably of 3 to 5 hours (at room temperture) or of 2 to 4 hours (at 50° to 95° C.). In some cases one may start at room temperature and then continue at a higher temperature. For instance, mixing may first be conducted at room temperature for a time between just a few minutes and 3 hours, and then the mixture may be maintained at between 50° and 95° C. for a further 2–3 hours.

It has been found that during mixing chemical reactions such as the following occur.

$$FeSO_4.7H_2O + MnO_2 \rightarrow MnSO_4 + FeOOH + 13/2\ H_2O + \tfrac{1}{4} O_2$$

$$FeSO_4.7H_2O + \tfrac{1}{4} O_2 \rightarrow \tfrac{1}{3} FeOOH + \tfrac{1}{3} Fe_2(SO_4)_3 + 4\ 1/6\ H_2O$$

Thus, the ferrous sulphate is converted to metahydrated FeOOH and ferric sulphate, while the pyrolusite is converted to $MnSO_4$, that is, to a soluble compound, without consumption of sulphuric acid (operating at 90° C. for 3 hours, more than 98% of the manganese goes into solution as sulphate).

The metahydrate that originates from the degrading of the ferrous sulphate forms the carrier on which settle the soluble components as the above reactions go on. The end product of the mixing consists of a close or intimate mixture in a very concentrated aqueous suspension, wherein practically the whole of the manganese and part of the iron are present as soluble salts impregnating the insoluble mass formed by the metahydrate.

Thus the problem of an intimate contact between the solid reactants is perfectly solved by the process of this invention, while at the same time there has been overcome the difficulty of having to supply on an industrial scale the manganous sulphate to be used as reactant.

Still another very considerable advantage of the process of the present invention is that of being able to control in a programmed way the tinting strength and purity of mass-tone of the pigment thereby obtained, both singly as well as jointly, by means of selective additives. To this end, and in accordance with a preferred embodiment of the process of this invention, the starting ferrous sulphate-pyrolusite mixture is additioned with one or more compounds selected from the group consisting of $FeCl_2$, $SiO_2$, $FeCl_3$, $Na_2SiO_3$, $Fe_3O_4$, $NaAlO_2$, $KAl(SO_4)_2$ and $NaBO_2$.

In general, the total quantity of additives added is between 0.5% and 5% by weight with respect to the finished product. Preferably, there is used a quantity between 0.8% and 2% by weight.

If desired the starting ferrous sulphate-pyrolusite mixture may be additioned with water in a quantity not exceeding 20% by weight, and preferably in a quantity between 5% and 10% by weight. In that case, the water may be acidified with small quantities of sulphuric acid, for instance from 1 to 5% by weight based on the finished pigment.

The slurry obtained at the end of the mixing is dried, in general at 120°–130° C. The dry substance, comminuted and sieved to below 0.5 mm, is fed into a conventional fluid bed reactor operating at 800°–900° C., but preferably between 830° and 860° C., heated either directly or indirectly, the fluid bed being fluidized with air flowing at a linear velocity of between 0.1 and 0.3 m/sec., but preferably between 0.15 and 0.25 m/sec.

The calcination can be conducted either in a continuous or an intermittent way.

The mean residence time of the solids in the fluid bed reactor is between 1 and 6 hours, but preferably between 3 and 4 hours.

The main advantage connected with the use of a fluid bed lies in the ease with which it is possible to thermally control the reaction, thereby avoiding local overheating on the surface of the granules which considerably damages the tinting strength of the pigment and often, if uncontrolled, leads to the sintering of the product.

The calcined product, consiting of mixed phases of $Fe_2O_3$ and $Mn_2O_3$, in the form of particles of a size between 0.2 and 0.5 micron, after cooling, is wet ground to the granular sizes required for the given end use, is then filtered, washed and dried at 100°–120° C.

The black and brown thermostable pigments obtained by the process of this invention are of a quality superior to that of broadly similar products described in the literature or found on the market.

Practically the whole sulphur present in the starting heptahydrated ferrous sulphate may be recovered as $H_2SO_4$ by conveying the gases coming from the calcination to a catalytic plant for the production of oleum.

Still other advantages and features of this invention will become even more clearly apparent upon consideration of the following examples:

EXAMPLE 1

According to per se known prior art techniques, there were mixed together in a mortar 32.8 g of pure precipitated magnetite (with equiaxial particles having a mean diameter of less than $0.1\mu$) and 22.6 g of technical pyrolusite (81.6% of $MnO_2$) sieved to below 44 microns and ground to a mean particle diameter of less than 1 micron. To this mixture were then added 15 cc of water having dissolved therein 0.7 g of NaCl, and the whole was then thoroughly mixed for 10 minutes.

The mixture was then dried overnight at 120° C. and, after comminution of the product to below 2 mm, the product was calcined in an electrically-heated muffle furnace at 850° C. for 3 hours in an air current. The calcined product, after cooling, was diluted with water in the ratio of 2 parts by weight of solids per 1 part by weight of water. It was then ground for 15 minutes under standard conditions in an extra hard steel grinder with metal masses driven by a mechanical eccentric stirrer.

The product was then filtered on a Buchner and washed 6 times on the filter with 150 cc of $H_2O$ at 80° C. each time. After drying at 110° C. until reaching a constant weight, a pigment was obtained (having 32% of $Mn_2O_3$) whose color characteristics, in terms of tinting strength and mass-tone, will be taken as the basis for comparison with the products obtained in the following examples.

EXAMPLE 2

Into a 5 liter ceramic ball mill were introduced 745 g of technical $FeSO_4.7H_2O$ at 95% concentration, 135 g of technical pyrolusite at 81.6% of $MnO_2$ screened to below 105 microns (mean particle diameter $\simeq 15\mu$), and 100 g of $H_2O$.

The mass was then mixed on rollers for 3 hours at room temperature, and the slurry thus formed was then poured into a porcelain capsule and kept overnight in an oven at 120° C. 100 g of the dry product, ground and screened at below 0.5 mm particle size, were then introduced into a quartz reactor having an inside diameter of 36 mm, and electrically heated at 850° C., and therein fluidized with 160 Nl/h of air.

The product was then calcined for 3 hours at 850° C. while absorbing the sulphurous gases coming from the reactor in a 10% soda solution.

The product, after having been calcined in the fluid bed, was treated exactly as described above in Example 1 so far as the final grinding, washing and drying steps are concerned.

In this way a black pigment having 32% of $Mn_2O_3$ was obtained, which in comparison to the one obtained above in Example 1, showed a slightly improved tinting strength and a definitely purer mass-tone.

Another aliquot of the dry product was subjected to calcination at 880° C. for 3 hours, operating as indicated above. In this way an improved product was obtained so far as the mass-tone was concerned, but with a lower tinting strength.

Still another aliquot of the dry product subjected to calcination at 820° C. for 4 hours resulted in an improvement of the tinting strength, but to the detriment of the mass-tone which turns out to be less pure.

EXAMPLE 3

Into a steel laboratory mill with metal masses driven by a mechanical eccentric vibrator were introduced 248 g of technical 95% $FeSO_4.7H_2O$, 45 g of technical pyrolusite having 81.6% of $MnO_2$ screened to under 105 microns (mean particle diameter $\simeq 15$ microns), 40 cc of water, and 1 cc of $H_2SO_4$ of 98% concentration (d = 1.84 g/cc). The mass was then stirred in a stirrer for 3 minutes and the resulting slurry transferred into a flask which for 3 hours was kept at 90° C. in a reflux water bath. The slurry was then dried overnight at 120° C.

100 g of dry ground product, screeened to under 0.5 mm particle size, was subjected to calcination in a fluid bed at 850° C. for 3 hours, exactly as described above in Example 2.

Also the final grinding, washing and drying steps were carried out as described in Example 2.

In this way a black pigment having 32% of $Mn_2O_3$ was obtained which, in comparison with that of Example 1, showed a much higher tinting strength and a definitely purer mass-tone.

In comparison with the pigment of Example 2, an appreciable improvement in dyeing power is observed, which turned out to be a more neutral shade less contaminated by red reflexes.

A still further improvement in tinting strength to the detriment of mass-tone, and in mass-tone to the detriment of the tinting strength, is obtainable upon carrying out the calcination at 820° C. for 4 hours and 880° C. for 3 hours, respectively, following otherwise the same procedures indicated above.

EXAMPLE 4

This time Example 3 was repeated but using instead 1.28 g of colloidal silica CAB-O-SIL M5 produced by Cabot Corporation having 98.1% of $SiO_2$.

In this way a black pigment having 32% of $Mn_2O_3$ was obtained which showed dyeing characteristics definitely superior to those obtained in Example 1. In comparison with the products of Examples 2 and 3, one obtains a definite improvement of the tinting strength whose tone proves, however, slightly less pure because of the presence of a weak reddish undertone.

EXAMPLE 5

Example 3 was repeated using as additive 2 g of pure $NaAlO_2$.

There was thus obtained a black pigment having 32% of $Mn_2O_3$ and showing pigmentary characteristics decidedly superior to those observed for the product of Example 1.

In comparison with the products of Examples 2 and 3, one observes a definite improvement in the mass-tone to the detriment of the tinting strength that turns out to be slightly lower.

EXAMPLE 6

Into a laboratory mill with extra-hard steel masses driven by a mechanical eccentric stirrer, the following ingredients were introduced:
- 210 g of technical $FeSO_4.7H_2O$ at 95% concentration;
- 45 g of technical pyrolusite having 81.6% of $MnO_2$, and screened to under 105 microns (mean particle diameter $\simeq 15\mu$);
- 10 g of precipitated equiaxial $Fe_3O_4$ (mean particle diameter $\simeq 0.1\mu$);
- 6 g of $FeCl_2.3.5H_2O$ having 67% of $FeCl_2$;
- 40 g of $H_2O$;
- 3 g $H_2SO_4$ of 98% concentration (d = 1.84 g/cc); and
- 4 g of $AlK(SO_4)_2.12H_2O$.

This reaction mass was ground for 3 minutes and then reflux-heated in a water bath for 3 hours at 90° C. The whole was then dried overnight at 120° C.

100g of the dry ground product, screened to under 0.5 mm particle size, was calcined for 3 hours at 850° C. in a fluid bed with 160 Nl/h of air, as described above in Example 2. The calcined product, after cooling, was ground, washed and dried exactly as described above in Example 1.

In this way a black pigment having 30% of $Mn_2O_3$ was obtained which proved decidedly superior to that of Example 1. Moreover, in comparison with the products of Examples 2 to 5 there was observed a definite improvement in both the tinting-strength as well as the mass-tone.

EXAMPLE 7

Into the laboratory mill already used for making the products of the preceding examples there were introduced 248 g of technical $FeSO_4.7H_2O$ at 95% concentration, 5 g of technical pyrolusite (81.6% of $MnO_2$) screened to below 105 microns and with a mean particle diameter of about 15μ, 2.2 g of colloidal silica (CAB-O-SIL M5 at 98.1% of $SiO_2$), and 22 g of $AlK(SO_4)_2.12H_2O$.

This mass was ground in a mechanical vibrator of 3 minutes and then directly dried overnight at 120° C. 100 g of dry product, screened to below 0.5 mm particle size, were calcined in a fluid bed for 3 hours at 850° C. with 160 Nl/h of air. The calcined mass was then subjected to the final grinding, washing and drying operations as described above in Example 1.

In this way there was obtained a brown pigment having 4.9% of $Mn_2O_3$, and showing pigmentary characteristics superior to those of otherwise generally similar known products, especially as far as tinting strength is concerned.

What is claimed is:

1. A process for the preparation of black and brown thermostable pigments consisting essentially of mixed phases of iron and manganese oxides, characterized in that
   a. pyrolusite, in the form of particles having a mean diameter between 5 and 20 microns, is mixed and maintained in contact together with heptahydrated ferrous sulphate and between 0.5% and 5% by weight, based on the final weight of product, of one or more compounds selected from the group consisting of $FeCl_2$, $SiO_2$, $FeCl_3$, and $Fe_3O_4$, at a temperature between room temperature and 95° C.; and
   b. the mass thereby obtained is dried, crushed and screened, and then calcined in the presence of air in a fluidized bed reactor at a temperature between 800° and 900° C. under fluidizing conditions for a period between one and six hours.

2. A process according to claim 1, wherein the starting pyrolusite/heptahydrated ferrous sulphate mixture is additioned with water in a quantity not exceeding 20% by weight.

3. A process for the preparation of black and brown thermostable pigments consisting essentially of mixed phases of iron and manganese oxides, comprising
   a. preparing an intimate mixture of pyrolusite, in the form of particles having a mean diameter between 5 and 20 microns, with raw crystalline heptahydrated ferrous sulphate and between 0.5% and 5% by weight, based on the final weight of product, of one or more compounds selected from the group consisting of $FeCl_2$, $SiO_2$, $FeCl_3$, and $Fe_3O_4$ at a temperature between room temperature and 95° C.;
   b. drying, crushing and screening the mass thereby obtained; and
   c. calcining the resulting mixture in a fluidized bed reactor under fluidizing conditions in the presence of air and at a temperature between 800° and 900° C. for a period between one and six hours.

4. Black and brown thermostable pigments obtained by the process according to claim 1.

* * * * *